Jan. 22, 1924.　　　　　R. MALCOM　　　　　1,481,475
GOGGLES
Filed July 14, 1920
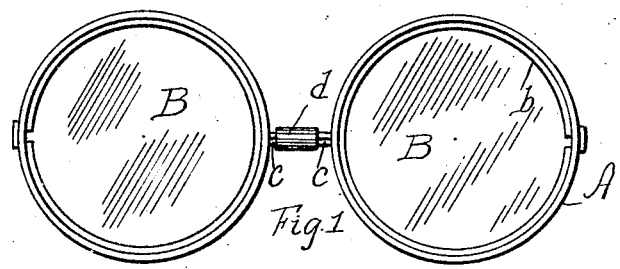
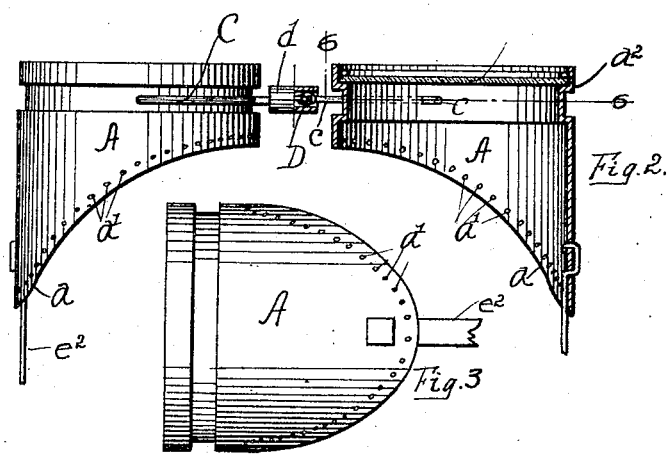
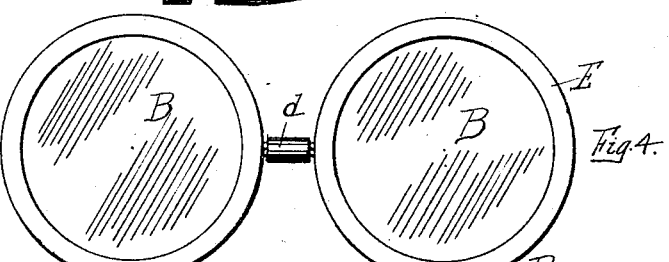
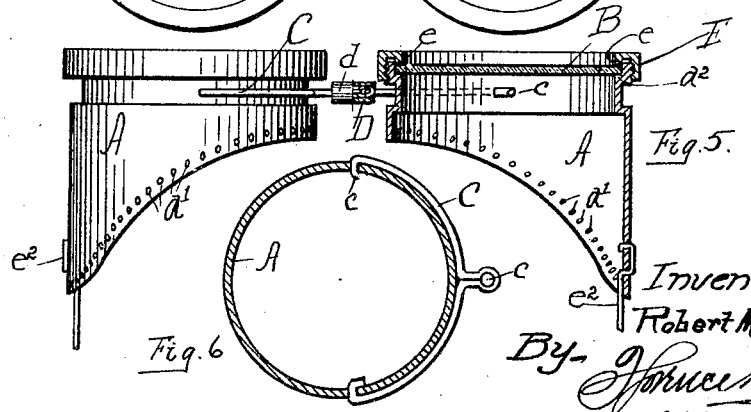
Inventor:
Robert Malcom.
By― Horace King
Attorney Patented Jan. 22, 1924.

1,481,475

UNITED STATES PATENT OFFICE.

ROBERT MALCOM, OF CHICAGO, ILLINOIS.

GOGGLES.

Application filed July 14, 1920. Serial No. 396,225.

*To all whom it may concern:*

Be it known that I, ROBERT MALCOM, a citizen of the United States, residing at Chicago, Cook County, Illinois, have invented certain new and useful Improvements in Goggles, of which the following, taken in connection with the drawings, is a description.

My invention has for its object the production of a pair of goggles or eye protectors designed to be worn by workmen and others who are exposed to heat from furnaces, dust or flying particles in the air, bright or reflected lights, etc., the principal purpose of which is to provide a more simple construction than those heretofore made; goggles which can be easily assembled; goggles constructed with the material light in weight and which will not absorb perspiration therefore keeping them always in sanitary condition; goggles in which the glass or lens may be changed without any tools or instruments for disengaging the parts; goggles which are extremely light in weight, yet in all respects practical and efficient for the purposes intended.

In the accompanying drawings I have illustrated what I now consider the preferred form of an embodiment of my invention, although it is obvious the size, proportion and details of the different parts may vary without departing from the spirit of my invention and in these drawings:—

Fig. 1 is a front elevation of the preferred form of construction;

Fig. 2 is a side elevation, one-half thereof being in section;

Fig. 3 is an end view of one of the eye cups or frames;

Fig. 4 is a front elevation of a modified form of construction;

Fig. 5 is a side elevation one half in section of the form of construction shown in Figure 4;

Fig. 6 is a transverse, sectional view taken on line 6—6 of Figure 2.

Referring to the drawings A represents the eye cups which in this instance are preferably formed of aluminum, having one side $a$ elongated diagonally of the axis thereof to extend to the temples of the wearer, fitting closely around the eyes to exclude dust, etc. These eye cups are preferably stamped out of metal, such as aluminum, the ends of the eye cup thereof being either soldered or riveted together to form the ring surrounding the lens of the goggles. Each of these eye cups A is provided with apertures $a'$ for ventilating purposes.

Near the forward end of each of the eye cups A I provide a circumferential shoulder $a^2$, which forms a seat for the glass or lens B which glass or lens may be of any desired color and size to close the opening in the eye cup.

$b$ is a spring wire ring inserted within the opening in the front of the eye cup, which bears against the glass or lens B holding the same in position upon its seat on the shoulder $a^2$. The expansive force of the spring wire $b$ is sufficient to hold the same in place within the wall of the eye cup and its bearing against the glass B is sufficient to hold it in proper position within the eye cup and upon the shoulder $a^2$.

C are retaining members, preferably semi-circular in outline and conforming in size and shape to the exterior of the eye cup A. These retaining members are preferably formed of wire, each end thereof bent inwardly to form an engaging hook $c$—$c$ which extends through an opening in the side walls of the eye cups beneath the glass or lens B.

At the center of these semi-circular retaining members C is formed a loop or eye $c'$ preferably by bending the wire forming the retaining members as shown more clearly in Figure 6. Engaging with the eye $c'$ formed in each retaining member is a flexible nose-piece D, in this instance formed of linked members as shown in Figures 2 and 5. Surrounding this nose piece is a sleeve $d$, which may be of rubber or the like to more comfortably fit the nose of the wearer.

In Figures 4 and 5 I have illustrated a slightly modified form of construction wherein the outer periphery of the eye cup is threaded to engage a retaining ring E which carries an inwardly turned shoulder $e$ which bears against the glass or lens B and holds the same in place instead of the spring wire $b$, shown in Figures 1 and 2.

The elongated side members of each of the eye cups is provided with a slot or opening $e'$, through which is removably attached an elastic head band $e^2$, by means of which the device is held in place when worn.

This head band is threaded through said opening from the inside, the end of the band being provided with an enlarged retaining portion which prevents it from passing through said slot, but permits its withdrawal from the inside whenever desired.

I claim:—

1. Goggles comprising a pair of eye cups formed of non-absorbent material, each elongated at one side diagonally of the axis thereof and having an outer circumferential groove formed therein, lenses, an inner circumferential shoulder forming a seat for each lens, a retaining ring having threaded engagement with the eyecup and bearing against the front of each lens, semi-circular retaining members in the aforesaid groove engaging the eyecups on opposite sides thereof, and a flexible nose bridge connecting said retaining members.

2. Goggles comprising a pair of eye cups formed of non-absorbent material, each elongated on one side diagonally of the axis thereof and having ventilating openings therethrough, each of said eye cups having a circumferential groove near the forward lens-holding end thereof, and a circumferential shoulder on the interior of the eye cup, a lens seating on the shoulder in each eyecup, a retaining ring having threaded engagement with the eye cup and bearing against the edge of each lens inside of the wall of the eye cup, semi-circular expansible retaining members positioned in the aforesaid groove of each eye cup, and a flexible nosepiece connecting said retaining members.

3. The combination in a pair of goggles having eye cups, each elongated on one side diagonally of the axis thereof, and having ventilating openings therein, each of the eyecups having an outer circumferential groove in the lens-holding end thereof presenting shoulders on the inner wall of the eyecups, a lens seated on one of said shoulders, a retaining member having threaded engagement with the outer wall of the eye cup, the free edge of said retaining member bent inwardly to form a groove receiving the edge of the eye cup, the edge of said retaining member bearing against the front of said lens, semi-circular expansible retaining frames in the aforesaid grooves, said frames having projections on the ends thereof to engage the eye cups through openings formed therein, a flexible nosepiece and means formed integrally with the aforesaid retaining frames for engaging the ends of said nosepiece, substantially as described.

4. The combination in a pair of goggles having eye cups formed of light weight non-absorbent material having ventilating openings therethrough, each eyecup having an outer circumferential groove formed therein, a circumferential shoulder on the inner wall of each eye cup, a lens thereon, a retaining member having engagement with the outer wall of the eye cup, said retaining member having the free edge thereof bent inwardly to form a ring adapted to contact with the edge of the lens and hold it in place, an expansible frame having a projection on each end thereof which extends through a corresponding opening in each eyecup, a flexible member connecting said expansible frame members and forming a nosebridge, substantially as described.

In testimony whereof I have signed this specification.

ROBERT MALCOM.